United States Patent
Li et al.

(10) Patent No.: US 8,926,143 B2
(45) Date of Patent: Jan. 6, 2015

(54) LIGHT-DIFFUSING ELEMENTS

(71) Applicant: Corning Incorporated, Corning, NY (US)

(72) Inventors: Ming-Jun Li, Horseheads, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 13/800,184

(22) Filed: Mar. 13, 2013

(65) Prior Publication Data

US 2014/0268815 A1    Sep. 18, 2014

(51) Int. Cl.
| | |
|---|---|
| *F21V 3/00* | (2006.01) |
| *G02B 5/02* | (2006.01) |
| *F21K 99/00* | (2010.01) |
| *F21V 8/00* | (2006.01) |
| *C03C 11/00* | (2006.01) |

(52) U.S. Cl.
CPC ............... *G02B 5/0247* (2013.01); *F21K 9/00* (2013.01); *G02B 6/001* (2013.01); *G02B 6/0041* (2013.01); *C03C 11/00* (2013.01)
USPC .................................................... 362/311.02

(58) Field of Classification Search
USPC ....................................... 362/311.02, 249.01
See application file for complete search history.

(56) References Cited

U.S. PATENT DOCUMENTS

| | | | |
|---|---|---|---|
| 7,450,806 B2 | 11/2008 | Bookbinder et al. | |
| 2008/0181567 A1* | 7/2008 | Bookbinder et al. | 385/127 |
| 2011/0058388 A1* | 3/2011 | Cassarly et al. | 362/558 |
| 2011/0305035 A1* | 12/2011 | Bickham et al. | 362/558 |
| 2012/0275178 A1 | 11/2012 | Logunov | |
| 2012/0275745 A1 | 11/2012 | Logunov | |

FOREIGN PATENT DOCUMENTS

| | | |
|---|---|---|
| JP | 2000137119 | 5/2000 |
| JP | 03240799 | 12/2001 |
| JP | 2003151305 | 5/2003 |
| JP | 2012103617 | 5/2012 |
| WO | 2010/001299 | 1/2010 |

OTHER PUBLICATIONS

Dewa et al; U.S. Appl. No. 13/269071, filed Oct. 7, 2011, Titled "Systems and Methods for Performing Photoreactions Using Light-Diffusing Optical Fiber".
Logunov et al; U.S. Appl. No. 13/713224, filed Dec. 13, 2012, Titled "Uniform White Color Light Diffusing Fiber".

(Continued)

*Primary Examiner* — Evan Dzierzynski
(74) *Attorney, Agent, or Firm* — Kevin L. Bray

(57) ABSTRACT

A light-diffusing element with high coupling efficiency to LED sources. The light-diffusing element may be a glass monolith that includes a plurality of internal voids. When light propagating through the monolith encounters the internal voids, it is scattered in a transverse direction and exits the lateral surface of the monolith to provide a broad-area illumination effect. The glass monolith has a diameter of at least 0.7 mm and features a numerical aperture of at least 0.6 to facilitate efficient coupling to LED sources. The internal voids have a cross-sectional dimension that ranges from about 100 nm to several microns and a length that ranges from about 1 μm to a few millimeters. The light-diffusing element can be configured as a rod or as a bent or arbitrarily-shaped fixture.

24 Claims, 5 Drawing Sheets

(56) References Cited

OTHER PUBLICATIONS

Logunov et al, U.S. Appl. No. 13/713248, filed Dec. 13, 2012, Titled "Uniform UV Efficient Light Diffusing Fiber".

Logunov et al; U.S. Appl. No. 13/646984, filed Oct. 8, 2012, Titled "Multi-Wavelength Light Source Using Light Diffusing Fibers".

Logunov et al; U.S. Appl. No. 13/633381, filed Oct. 2, 2012, Titled "Manipulation of Color Illumination Using Light Diffusing Fiber".

Genier, U.S. Appl. No. 13/661570, filed Oct. 26, 2012, Titled "Light Diffusing Optical Fiber With UV Protection Layer".

Genier, U.S. Appl. No. 13/605153, filed Sep. 6, 2012, Titled "Optical Fiber Interfaces Comprising Light Blocking Elements and Illumination Systems Comprising Light Blocking Elements".

Fewkes et al; U.S. Appl. No. 13/269055, filed Oct. 7, 2011, Titled "Optical Fiber Illumination Systems and Methods".

\* cited by examiner

LIGHT-DIFFUSING ELEMENTS

FIELD

The present disclosure relates generally to optical materials and systems for transmitting and diffusing light. More particularly, the present disclosure relates to glasses containing low-index voids for scattering and diffusing light. Most particularly, the present disclosure relates to void-containing glass cores having high coupling efficiency to LED illumination sources

TECHNICAL BACKGROUND

Many optical systems utilize optical fibers to deliver light from a remote light source to a target destination. In a typical system, the light source is coupled to the fiber and light supplied by the source is guided by the fiber to the target destination. Optical fibers have been widely used in telecommunications to deliver information encoded in the form of an optical signal. A telecommunications link includes a transmitter that converts an electrical signal to an optical signal. The optical signal is launched into the fiber and transmitted to a receiver that reconverts the optical signal back to an electrical signal for further processing at the destination end of the link. Optical fibers have also been used as point illumination sources. In these applications, light from a source is coupled to the receiving end of the fiber and emerges from the destination end of the fiber as an illuminating beam.

There has recently been interest in extending the use of optical fibers to applications in broad-area illumination. In these systems, the objective is to achieve controlled release of light along at least portions of the length of the fiber. Instead of using the fiber to confine light and transmit it with minimal losses from a source to provide point illumination to a target positioned in the direction of the fiber axis, the objective is to use the lateral surface of the fiber as a broad-area source of illumination that operates in the radial direction of the fiber.

Light-diffusing fibers are a class of fibers that can be used as a broad-area illumination source. Light-diffusing fibers are designed to scatter light propagating along the fiber axis in the radial direction. Radial scattering is accomplished by incorporating nanostructural voids within or throughout the core and/or cladding regions of the fiber. The voids are low-index regions, typically filled with a gas, and have dimensions on the order of the wavelength of the light propagating through the fiber. The refractive index contrast between the voids and surround dense glass matrix effects scattering of the light. The scattering efficiency, and hence intensity of scattered light, can be controlled by controlling the dimensions, spatial arrangement and number density of voids. In addition to broad-area illumination, light-diffusing fibers can be employed in displays and as light sources in photochemical applications. Further information about light-diffusing fibers and representative applications can be found in U.S. Pat. No. 7,450,806 and U.S. Pat. Appl. Pub. No. 20110122646, the disclosures of which are hereby incorporated by reference herein.

Light-diffusing fibers are versatile and compact sources of broad-area radial illumination and offer the further advantage of maintaining functionality when bent. This allows light-diffusing fibers to be deployed as illumination sources in tight spaces and areas where it is impossible to deploy conventional light sources. In order to achieve functionality in restricted spaces and in bent configuration, the diameter of the fiber needs to be small. The central glass portion (core+cladding) of a fiber typically needs to be on the order of 125 µm or less to avoid fracture upon bending.

One of the drawbacks associated with the low diameters of light-diffusing fibers is poor coupling efficiency to LED (light-emitting diode) sources. With the increasing trend away from conventional incandescent light sources, LEDs are expected to become increasingly important. It would be desirable to have a diffusive lighting element capable of coupling efficiently to LED light sources.

SUMMARY

This disclosure provides a light-diffusing element for broad-area illumination that couples efficiently to LED sources. The light-diffusing element and may be configured from glass that may include internal voids. The internal voids may be nanostructural or microstructural regions that act as scattering centers to redirect light propagating in the direction of the central axis of the element in a radial, transverse or off-axis direction. The scattered light may exit the lateral surface of the element to provide broad-area illumination.

The internal voids may be distributed throughout the cross-sectional direction of the element or localized to particular regions thereof. The internal voids may be configured as a ring having a particular thickness located at a particular radial position within the element.

The internal voids may be configured to scatter one or more wavelengths of light in the range from 200 nm to 2000 nm.

The light-diffusing element may scatter light uniformly along its length. The scattering efficiency at the illumination wavelength along the length of the light-diffusing element may vary by less than 50% of the maximum value, or less than 30% of the maximum value, or less than 20% of the maximum value. The variation in the intensity of light scattered through the outer surface may vary by less than 50% of the maximum value along the length of the element at the illumination wavelength, or less than 30% of the maximum value along the length of the element at the illumination wavelength, or less than 20% of the maximum value along the length of the element at the illumination wavelength.

The shape of the light-diffusing element may be linear, bent, or coiled. The light-diffusing element may be rigid and inflexible, and the shape may be permanent. A variety of shapes can be achieved to provide lighting fixtures with unique shapes and patterns of illumination.

The light-diffusing element may include a surface coating. The surface coating may include phosphors or fluorescent components that shift the wavelength of light scattered from the element. The coating may absorb scattered light and reemit it at a different wavelength. The surface coating may also include scattering centers that act to make the angular distribution more uniform. The surface coating may compensate for any preferential tendency of the internal voids to scatter light in the forward vs. backward or off-axis directions.

The light-diffusing element may couple directly to a light source or couple to a light source through an intervening element. The light source may be a lamp, a laser, a laser diode, or an LED. The intervening element may be an optic, a clear glass rod, or a light-transmissive polymer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1A:
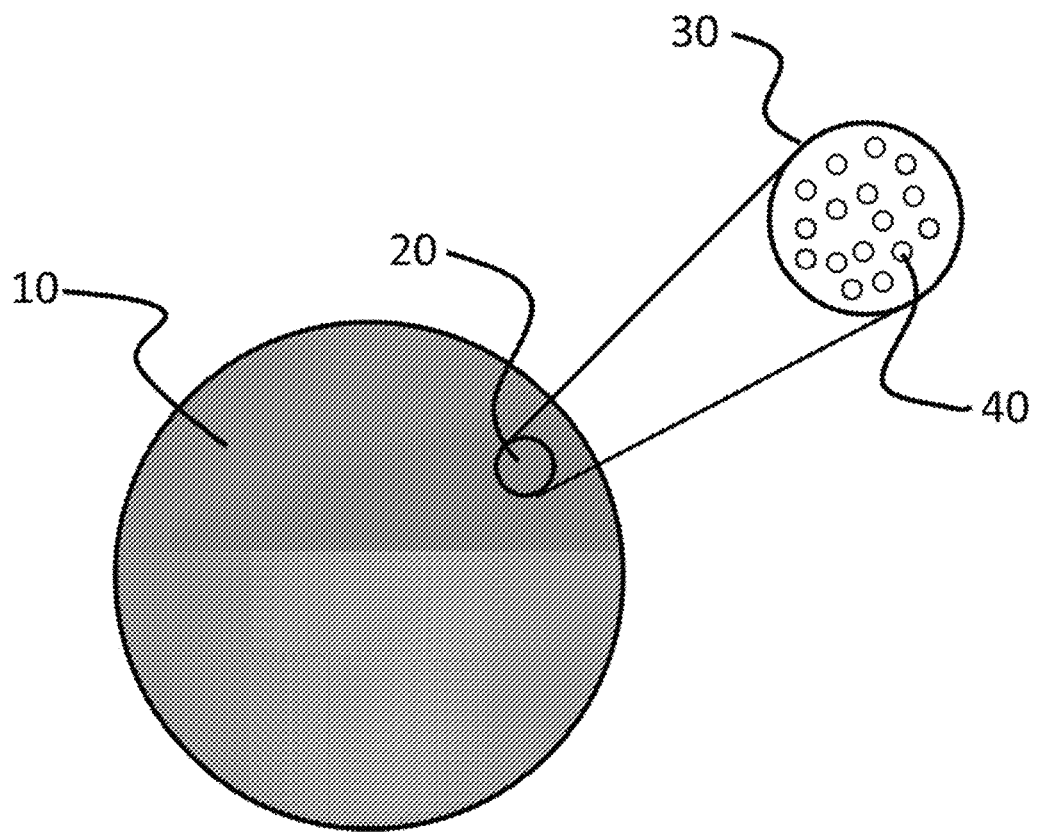
FIG. 1A is a schematic depiction of a cross-section of a light-diffusing element having internal voids distributed throughout.

The present disclosure provides a light-diffusing element that couples efficiently to a variety of light sources, including LEDs. The light-diffusing element may be formed from glass and may include internal voids. The internal voids may be nanostructural or microstructural and may operate to scatter light passing through the element. The light passing through the element may propagate in an axial or longitudinal direction within the element and the internal voids may scatter the light in an off-axis or transverse direction. The scattered light may be directed to and pass through the lateral surface of the element to provide, for example, an illumination effect. The illumination effect may be broad-array illumination provided, for example, by illumination along all or a portion of the length of the element.

The light-diffusing element may be incorporated in an optical system that includes a light source. The light source may be a lamp, diode, laser, laser diode, LED (light-emitting diode) or other source. The light source may operate over all or part of the spectral range from 200 nm to 2000 nm.

The light-diffusing element may have a cross-sectional dimension and a length dimension. The length dimension may be the dimension in the direction in which light propagates through the element and the cross-sectional dimension may be the direction transverse to the direction of light propagation. In the instance in which the light-diffusing element has a rod configuration, the length dimension may be the axial dimension, the cross-section may be circular, and the cross-sectional dimension may be the diameter. It is to be understood, however, that the cross-section of the light-diffusing element may be arbitrarily shaped and may include round or flat sides. Shapes of the cross-section may include circle, oval, square, rectangle, and polygon as well as shapes that include a combination of round and flat sides. As used herein, cross-sectional dimension refers to the longest straight-line distance that connects two points of the outline (e.g. circumference, perimeter) of the cross-section.

The light-diffusing element may have a cross-section with a dimension of at least 0.5 mm, or at least 0.7 mm, or at least 1 mm, or at least 2 mm, or at least 3 mm. The cross-sectional dimension of the light-diffusing element may be between 0.5 mm and 20 mm, or between 0.7 mm and 10 mm, or between 0.7 mm and 5 mm, or between 1 mm and 20 mm, or between 1 mm and 10 mm, or between 1 mm and 4 mm, or between 2 mm and 5 mm. The length of the light-diffusing element may be at least 1 cm, or at least 5 cm, or at least 20 cm, or at least 50 cm, or at least 100 cm, or at least 500 cm. The length of the light-diffusing element may be between 1 cm and 500 cm, or between 1 cm and 100 cm, or between 1 cm and 50 cm, or between 1 cm and 20 cm, or between 5 cm and 100 cm, or between 5 cm and 50 cm, or between 5 cm and 20 cm.

The cross-sectional dimension of the light-diffusing element is significantly greater than the typical cross-sectional dimension of ~125 µm for the combined core and cladding regions of an optical fiber. The light capture efficiency of a waveguide is proportional to its etendue, which is defined as $G=S(NA)^2$, where S is the cross-sectional area and NA is the numerical aperture of the waveguide. The larger cross-sectional dimension of the light-diffusing element leads to an increase in etendue relative to an optical fiber and this increased numerical aperture improves the efficiency of coupling to LED light sources. A typical LED source has a cross-sectional area of 1 mm$^2$ or higher and a numerical aperture (NA) of ~0.9, while the typical optical fiber has a cross-sectional area of ~0.2 mm$^2$ and a numerical aperture of ~0.5 or less. The present light-diffusing element may have a cross-sectional area of at least 0.38 mm$^2$, or at least 0.78 mm$^2$, or at least 3.14 mm$^2$, or at least 7.06 mm$^2$, and a numerical aperture of at least 0.7, or at least 0.8, or at least 0.9 and provides more efficient coupling to LED sources.

The internal voids may have a cross-section with a dimension in the range from a few hundred nanometers to several microns; for example, between 100 nm and 20 µm, or between 500 nm and 10 µm, or between 500 nm and 5 µm. The internal voids may have a length in the range from a few microns to a few millimeters; for example between 1 µm and 5 mm, or between 3 µm and 2 mm, or between 5 µm and 1 mm. The internal voids within the element may include a distribution of cross-sectional dimensions and lengths. The internal voids may be configured in a random or non-periodic arrangement.

The internal voids may occupy a fill fraction of between 0.5% and 20% of the element, or between 1% and 15% of the element, or between 2% and 10% of the element. As used herein, fill fraction refers to the fraction of the cross-sectional area occupied by the internal voids. To a good approximation, the fill fraction corresponds to the volume fraction of internal voids. The volume fraction of voids within the element may be between 0.5% and 20%, or between 1% and 15%, or between 2% and 10%.

Figure 1B:
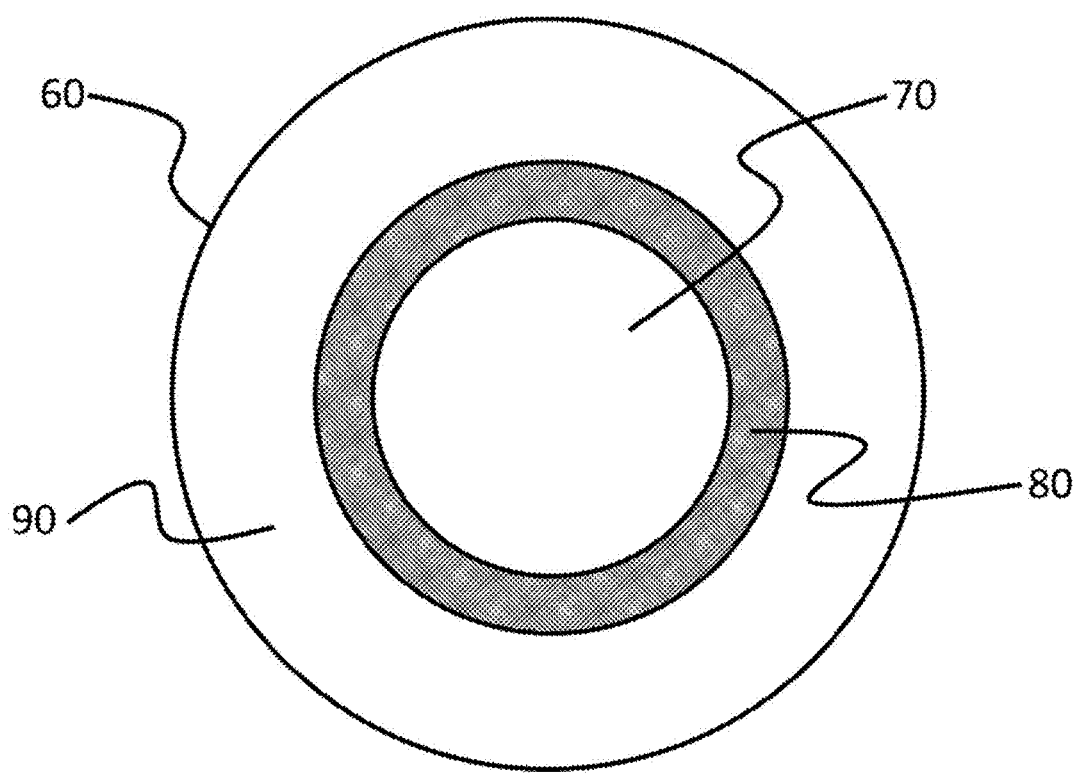
FIG. 1B is a schematic depiction of a cross-section of a light diffusing element having internal voids localized in an annular region.

The internal voids may be distributed throughout the cross-section of the element or localized within one or more discrete regions thereof. FIGS. 1A and 1B illustrate two of many spatial distributions of internal voids within the element. FIG. 1A shows a cross-section of a light-diffusing element in accordance with the present disclosure. Cross-section 10 includes enlargement 30 of region 20, which illustrates internal voids 40. In FIG. 1A, internal voids 40 are distributed throughout cross-section 10. For purposes of illustration, internal voids 40 are shown as having uniform cross-sectional size and shape. In practice, a distribution of sizes and shapes for the internal voids will be present. FIG. 1B shows a cross-section of a different light-diffusing element in accordance with the present disclosure. Cross-section 60 includes inner region 70 without voids, annular region 80 with internal voids, and outer annular region 90 without internal voids. Inner region 70 and outer annular region 90 may be solid glass regions. The width of annular region 80 may be in the range from 5% to 90% of the cross-sectional dimension of the light-diffusing element, or from 10% to 90% of the cross-sectional dimension of the light-diffusing element, or from 30% to 90% of the cross-sectional dimension of the light-diffusing element.

The cross-sectional distribution of internal voids may vary at different positions along the length of the light-diffusing element. As noted, the length and cross-sectional attributes (e.g. shape and size) of the internal voids may vary. The variations may also occur in the axial or length direction of the element. Since the length of the internal voids may not extend the full length of the element, particular internal voids may be present in some cross-sections and absent in other cross-sections.

The internal voids may be filled with a gas. Suitable gases include $SO_2$, noble gases, $CO_2$, $N_2$, $O_2$, air, or mixtures thereof.

The light-diffusing element may be configured to scatter light along all or some of its length by controlling the placement of the internal voids. Regions of the element that include internal voids may efficiently scatter light to produce an illumination effect, while regions of the element that lack internal voids may not. As described more fully below, processing conditions may be used to control whether internal voids form in a particular region of the element and the spatial and dimensional characteristics of internal voids that do form. The light-diffusing element may include cross-sections or extended lengths of solid glass that scatter little or no light along with cross-sections or extended lengths that include internal voids. Regions or cross-sections with and without voids may be interspersed or alternating along the length of the element.

The brightness of the light-diffusing element as an illumination source may depend on the intensity of scattered light that passes through outer surface of the element. The intensity of scattered light may depend on the scattering loss of light from the illumination source as it propagates through the element. A higher scattering loss generally increases the brightness of the light-diffusing element. To achieve adequate brightness in some applications, the scattering loss may be at least 0.1/dB/m, or at least 1 dB/m, or at least 5 dB/m, or at least 100 dB/m.

In some applications, it may be desirable to achieve uniformity in illumination intensity along the length of the light-diffusing elements or selected regions thereof. The intensity of scattered light that passes through the outer surface of the element may have a maximum value. The variation in the intensity of the scattered light that passes through the outer surface of the element may vary by less than 50% of the maximum value along the length of the element or selected portions thereof at the illumination wavelength, or less than 30% of the maximum value along the length of the element or selected portions thereof at the illumination wavelength, or less than 20% of the maximum value along the length of the element or selected portions thereof at the illumination wavelength.

The scattering efficiency may vary along the length of the light-diffusing element. It may be desirable to control the degree of variation of scattering of the illumination wavelength along the length of the light-diffusing element or selected portions thereof to achieve a more uniform illumination effect. The scattering efficiency may be different near the source end of the element relative to near the delivery end of the element. The scattering efficiency may increase along the element with increasing distance from the source end of the element. The scattering efficiency along the length of the element may have a maximum value. The scattering efficiency at the illumination wavelength along the length of the light-diffusing element or selected portions thereof may vary by less than 50% of the maximum value, or less than 30% of the maximum value, or less than 20% of the maximum value. The stated variations in scattering efficiency, scattered light intensity, and/or the stated scattering losses may be simultaneously realized in the light-diffusing element.

The light-diffusing element may optionally include a surface coating. The surface coating may be in direct contact with the outer surface of the light-diffusing element and the light-diffusing element may lack a cladding. The surface coating may include a scattering layer that may control or modify the angular distribution of light scattered by the internal voids. The scattering layer may be utilized to enhance the distribution and/or the nature of the scattered light. The scattering layer may include scattering centers that may make the angular distribution of light scattered by the internal voids more uniform. In some instances, for example, scattering by the internal voids may occur more preferentially in the direction of light propagation (forward scattering) and scattering opposite the direction of light propagation (back scattering) or in off-axis directions may occur less preferentially. A surface scattering layer may compensate for preferential angular scattering to provide a more uniform distribution of scattered light.

The scattering material may comprise nano- or microparticles with an average diameter of from about 200 nm to about 10 μm. The average diameter of the scattering particles may be about 200 nm, or 300 nm, or 400 nm, or 500 nm, or 600 nm, or 700 nm, or 800 nm, or 900 nm, or 1 μm, or 2 μm, or 3 μm, or 4 μm, or 5 μm, or 6 μm, or 7 μm, or 8 μm, or 9 μm, or 10 μm. The concentration of the scattering particles may vary along the length of the element or may be constant and may be present in a weight percent sufficient to provide uniform scattering of light while limiting overall attenuation. The weight percentage of the scattering particles in the scattering layer may comprise about 1%, or 2%, or 3%, or 4%, or 5%, or 6%, or 7%, or 8%, or 9%, or 10%, or 11%, or 12%, or 13%, or 14%, or 15%, or 16%, or 17%, or 18%, or 19%, or 20%, or 25%, or 30%, or 35%, or 40%, or 45%, or 50%. The scattering layer may comprise small particles or colloids of a scattering material that may include a metal oxide or other high refractive index material, such as $TiO_2$, $Al_2O_3$, ZnO, $SiO_2$, or Zr. The scattering material may also comprise micro- or nano-sized particles or voids of low refractive index, such as gas bubbles. The width of the scattering layer may be greater than about 1 μm, or 2 μm, or 3 μm, or 4 μm, or 5 μm, or 6 μm, or 7 μm, or 8 μm, or 9 μm, or 10 μm, or 20 μm, or 30 μm, or 40 μm, or 50 μm, or 60 μm, or 70 μm, or 80 μm, or 90 μm, or 100 μm.

The scattering material may contain $TiO_2$-based particles, such as a white ink, which provides for substantially angle-independent distribution of light scattered from the internal voids of the light-diffusing element. The scattering particles may comprise a sublayer within the scattering layer. The particle sublayer may have a thickness of about 1 μm to about 5 μm. The thickness of the particle layer and/or the concentration of the particles in the scattering layer may be varied along the length of the element so as to provide more uniform variation in the intensity of light scattered from the light-diffusing element at large angles (e.g. angles greater than about 15 degrees).

The surface coating may include an emissive layer that includes phosphors or fluorophores capable of absorbing light scattered by the internal voids and reemitting it at a shifted wavelength. The emissive surface layer may be in direct contact with the light-diffusing element or may be applied as an additional surface layer that surrounds and is in direct contact with a scattering layer. The fluorescent or phosphorescent material in the emissive layer may comprise any organic or inorganic fluorescent or phosphorescent material. The emissive layer may include transition metal oxides, rare earth oxides, quantum dots, nanoparticles, metal-enhanced fluorescence of organic fluorophores, organic dyes, etc. Light-emitting metal centers include $Cr^{3+}$, $Ce^{3+}$, $Nd^{3+}$, $Tb^{3+}$, $Eu^{3+}$, and $Pr^{3+}$. Light-emitting metal centers may be incorporated as dopants in inorganic host lattices, including oxides such as $Y_3Al_5O_{12}$ or $Al_2O_3$. Quantum dots may include a light-emitting semiconductor material such as CdS, CdSe, ZnTe, or related materials.

The emissive layer may comprise a polymer coating. The polymer coating may comprise be any liquid polymer or prepolymer material into which a fluorescent or phosphorescent center may be added and in which the blend may be applied to the element as a liquid and then converted to a solid after application to the element. For example, the emissive layer may comprise a polymer coating such as an acrylate-based or silicone based polymer that incorporates a fluorescent or phosphorescent material that converts light scattered from the element to a different wavelength of light. The emitted wavelength may be a longer wavelength than the scattered wavelength. The fluorescent or phosphorescent material may be blended into a UV-curable acrylate based coatings and applying the blend directly or in diluted form to the element to obtain an emissive coating.

White light may be emitted from the light-diffusing element by coating it with an emissive layer containing a fluorescent or phosphorescent material and coupling it to a UV or near-UV light source. The combined effect of scattered UV or near-UV light from the source that passes through the emissive layer without being absorbed and wavelength-shifted light produced by the emissive layer upon absorption of the scattered UV or near-UV light may produce while light illumination. The source light wavelength may be from about 300-550 nm, or about 300 nm, or 350 nm, or 400 nm, or 450 nm, or 500 nm, or 550 nm.

As noted, the output of the light-diffusing element may include a combination of scattered incident UV or near-UV light and scattered fluorescent or phosphorescent light from the emissive layer, where the combined light appears white. In some embodiments, the combined light has an x coordinate from about 0.15 to about 0.25 and y coordinate of from about 0.20 to about 0.30 when measured on the x- and y-axes of the CIE 1931 x, y chromacity space (T. Smith and J. Guild, *The C.I.E. Colorimetric Standards and Their Use*, 33 TRANS. OP. SOC. 73-134 (1931), the disclosure of which is herein incorporated by reference in its entirety). The combined light may have an x coordinate from about 0.18 to about 0.23, or about 0.15, or 0.16, or 0.17, or 0.18, or 0.19, or 0.20, or 0.21, or 0.22, or 0.23, or 0.24, or 0.25 on the CIE 1931x, y chromacity space. The combined light may have a y coordinate from about 0.23 to about 0.27, or about 0.20, or 0.21, or 0.22, or 0.23, or 0.24, or 0.25, or 0.26, or 0.27, or 0.28, or 0.29, or 0.30 on the CIE 1931 x, y chromacity space.

The light-diffusing element may have a protective polymer jacket that does not directly contact the surface of the element. An air gap may be present between the light-diffusing element and the protective polymer jacket. The jacket may be formed from a material having an index of refraction higher than the index of refraction of the surface of the light-diffusing element surface. When an air gap is present, the protective polymer jacket may not alter the distribution of light intensity in the light-diffusing element. The polymer jacket may include a scattering material or component, either internally as a filler or applied to the external surface of the jacket (e.g. a white diffusing paint), to make the angular distribution of light intensity from the element more uniform. The polymer jacket may have include a partially reflecting or diffusing material on its surface to direct the distribution of light intensity emanating from the element in a predetermined direction.

The polymer jacket may be incorporated as a surrounding layer with a scattering layer and/or emissive layer. A scattering layer may surround the light-diffusive element and the polymer jacket may surround the scattering layer. The scattering layer may be in direct contact with the polymer jacket and/or in direct contact with the outer surface of the light-diffusing element. An emissive layer may be positioned between the outer surface of the light-diffusing element and/or the scattering layer and polymer jacket.

The light-diffusing element may be made by forming a soot-containing optical fiber preform via chemical vapor deposition (CVD) or other techniques known in the art. The soot preform may be consolidated in a gaseous atmosphere that surrounds the preform. Consolidation in the presence of the gaseous atmosphere causes a portion of the gaseous atmosphere to become trapped in the preform during consolidation, thereby resulting in the formation of voids in the consolidated preform. The voids may be non-periodically distributed in the consolidated preform and each void may correspond to a region of at least one trapped consolidated gas within the consolidated glass preform. The consolidated preform with voids is then drawn to make a light-diffusing element in accordance with the present disclosure. At least some of the voids formed in the preform during consolidation remain in the drawn element. A light-diffusing fiber or multiple light-diffusing fibers may be utilized in place of a fiber perform.

The conditions under which consolidation occurs may be manipulated to control the size, shape, length, fill fraction, and spatial distribution of voids. Directional control of void characteristics (e.g. along the axial vs. transverse directions) may also be achieved. The consolidation conditions may be effective to result in a significant amount of gases being trapped in the consolidated glass blank, thereby causing the formation of non-periodically distributed voids in the consolidated glass preform. The resultant preform is used to form a light-diffusing element with voids therein. By utilizing relatively low permeability gases and/or relatively high sintering rates, holes can be trapped in the consolidated glass during the consolidation process. During the soot consolidation step, the soot goes through a densification process via exposure to high heat to remove the open porosity (e.g. pores between the soot which is not surrounded by densified glass) and leaving leave densified glass. In the context of the present disclosure, the trapping of substantial amounts of the ambient gas present in the consolidation process precludes full densification of the glass and voids remain in the glass after consolidation. Soot consolidation may be performed in a soot consolidation furnace. The sintering rate can be increased by increasing the sintering temperature and/or increasing the downfeed rate of the soot preform through the sintering zone of the consolidation furnace. Under certain sintering conditions, it is possible to obtain glasses in which the area fraction of the trapped gases is a significant fraction of the total area or volume of the preform.

A soot preform may be formed by depositing silica-containing soot onto an outer surface of a rotating and translating mandrel or bait rod. This process is known as the OVD or outside vapor deposition process. The mandrel is preferably tapered and the soot is formed by providing a glass precursor in gaseous form to the flame of a burner to oxidize it. A fuel, such as methane ($CH_4$) and a supporting combustion gas, such as oxygen, is provided to the burner and ignited to form the flame. Glass former compounds are oxidized in the flame to form a generally cylindrically-shaped soot region. A dopant compound may be included.

The soot preform may be consolidated in a consolidation furnace to form a consolidated blank. Prior to consolidation, the mandrel is removed to form a hollow, cylindrical soot blank preform. During the consolidation process, the soot preform is suspended, for example, inside a pure quartz muffle tube of the consolidation furnace by a holding mechanism. Preferably, before the consolidation step, the preform is exposed to a drying atmosphere. For example, a suitable drying atmosphere may include about 95% to 99% helium and 1% to 5% chlorine gas at a temperature of between about 950° C. and 1250° C. and a suitable drying time ranges from about 0.5 and 4.0 hours.

During the consolidation step, which preferably takes place after a soot drying step, the furnace temperature is raised and the preform is consolidated at a suitable temperature, for example between about 1390° C. and 1535° C. to form a consolidated preform.

Gradient sintering may be employed whereby the soot preform is driven down through a hot zone of the furnace, which is maintained at a temperature of between about 1225° C. to 1550° C., or between about 1390° C. and 1535° C. For example, the preform may be held in an isothermal zone which is maintained at a desired drying temperature (950-1250° C.), after which the soot preform is driven through a zone which is maintained at a desired consolidation temperature (e.g. between 1225° C. and 1550° C., or between 1390° C. and 1535° C.) at a rate of speed which is sufficient to result in the preform temperature increasing by greater than 1° C./min. Upper zones of the furnace can be maintained at lower temperatures which facilitate a drying and impurity removal step. The lower zone can be maintained at the higher temperatures desired for consolidation. The soot containing preform may be downfed through a consolidation hot zone at a first downfeed rate, followed by downfeeding of the preform through a second hot zone at a second downfeed rate which is less than the first downfeed rate. Such a consolidation technique results in the outside portion of the soot preform sintering before the rest of the preform sinters, thereby facilitating trapping of gases which will in turn facilitate formation of and retaining of voids in the resultant consolidated glass.

For example, the preform can be exposed to such suitable consolidation temperatures (e.g. greater than about 1390° C.) at a first speed which is sufficient to result in the preform temperature increasing by more than 15° C./min, more preferably greater than 17° C./min, followed by at least a second downfeed rate/consolidation temperature combination which is sufficient to result in the preform heating by at least about 12° C./min, more preferably greater than 14° C./min. Preferably, the first consolidation rate results in the outside of the preform increasing in temperature at a rate which is greater than 2° C./min, or greater than 10° C./min, or greater than about 20° C./min, and most preferably greater than 50° C./min higher than the heating rate of the second consolidation rate. If desired, a third consolidation step or even further consolidation steps can be employed which heats at a slower rate (e.g. less than 10° C./min). Alternatively, the soot preform can be sintered at even faster rates in order to create more voids by driving the soot preform through a furnace hot zone where the temperature is greater than 1550° C., or greater than 1700° C., even more preferably greater than 1900° C. Alternatively, the soot preform can be sintered at even faster rates external to the furnace by using an open flame or plasma torch in contact with the soot.

Preferred sintering gases (e.g. the void-producing gas that surrounds the preform during the sintering step) that may be used in the consolidation step include one or more of $N_2$, Ar, Kr, $CO_2$, $O_2$, air, $SO_2$, $Cl_2$, $CF_4$, or mixtures thereof. Void-producing gases may be used directly or in the presence of a diluent gas. Each of the void-producing gases exhibits a relatively low permeability in silica glass at or below the consolidation temperature that is suitable for forming voids in accordance with the methods present disclosure. Preferably these void-producing gases are employed either alone or in combination in an amount between 5% and 100% by volume, or between about 20% and 100% by volume, or between about 40% and 100% by volume. The remainder of the sintering gas atmosphere is made up of a suitable diluent or carrier gas such as, for example, helium, hydrogen, deuterium, or mixtures thereof. Generally speaking, the greater the percentage of void producing gases employed in the sintering gas, the larger and more abundant the voids will be in the resultant consolidated glass.

When it is desired to deposit additional soot via OVD to the resultant glass perform or cane subsequent to the void-producing consolidation process, a sintering gas that includes less than 10% $O_2$, or less than 5% $O_2$, or no $O_2$ may be employed to avoid loss of seeds upon exposure to hydrogen formed in the OVD process. The void-producing gas may be a combination of $N_2$ and Ar, where the combination of $N_2$ and Ar is employed in the sintering atmosphere in an amount greater than 10% by volume, or greater than 30% by volume, or greater than 50% by volume. Generally speaking, the greater the percentage by volume of void-producing gases employed in the sintering gas, the larger and more abundant the voids will be in the resultant consolidated glass.

Using the sintering gases described herein, it is desirable to employ a consolidation process which includes a downfeed of the preform at a rate and temperature which is sufficient to result in at least some of the consolidation gases being intentionally trapped. This can occur, for example, by heating of at least a portion of the soot preform greater than about 10° C./min, more preferably greater than about 12° C./min, even more preferably greater than about 14° C./min. The sintering temperatures employed in the present invention preferably are greater than 1100° C., or greater than 1300° C., or greater than 1400° C., or and greater than 1450° C.

The gaseous atmosphere employed during the consolidation process, the temperature inside the consolidation furnace, and preform consolidation rate are selected so that, during the soot consolidation process, gases are intentionally trapped within the preform, forming holes in the consolidated glass. These gas containing voids are preferably not entirely outgassed prior to and/or during the element drawing process, so that the voids remain in the element after the element has been drawn. A variety of process parameters can be controlled to vary and control the size of the voids. For example, increasing the consolidation time or temperature can increase the void size, as the increased temperature causes the gases trapped within the voids to expand. Similarly, the size and area percent of the voids can be impacted by the draw conditions. For example, a longer hot zone in a draw furnace and/or faster draw speeds tend to increase the size as well as the area percent of the voids. Selection of a gas that is more permeable in glass at the consolidation temperature will result in smaller voids.

Sintering rate can also have a significant effect on void size and void density. A faster sintering rate will result in the formation of more and larger voids. However, use of sintering rates that are too slow will result in no voids being formed, as the gas will have time to escape through the glass. Consequently, the downfeed rate of the preform and/or the consolidation temperature employed are preferably high enough to result in the heating of at least a portion of the preform at a rate greater than about 10° C./min, more preferably greater than about 12° C./min, even more preferably greater than about 14° C./min. Generally speaking, a preform having a lower soot density will result in formation of more voids. However, the density of the deposited soot in a particular preform can be varied to position more voids (higher regional void area percent) where desired. For example, a first high density soot region can be deposited directly onto a consolidated glass (e.g. pure silica) core cane, followed by a second region of soot having a lower density than that of the first. We have found that this causes a higher void area percent to form near the core (i.e. in the high density soot region). The silica containing soot preferably has a bulk density of between about 0.10 g/cc and 1.7 g/cc, more preferably between about 0.30 g/cc and 1.0 g/cc. This effect can also be used to form consolidated void containing preforms which alternate between low or no void containing regions and higher void containing regions; wherein the initial soot density radial variation is greater than 3 percent over a distance of at least 100 μm. Additional information about fabrication and processing may be found in U.S. Pat. No. 7,450,806, the disclosure of which is hereby incorporated by reference herein.

Figure 2:
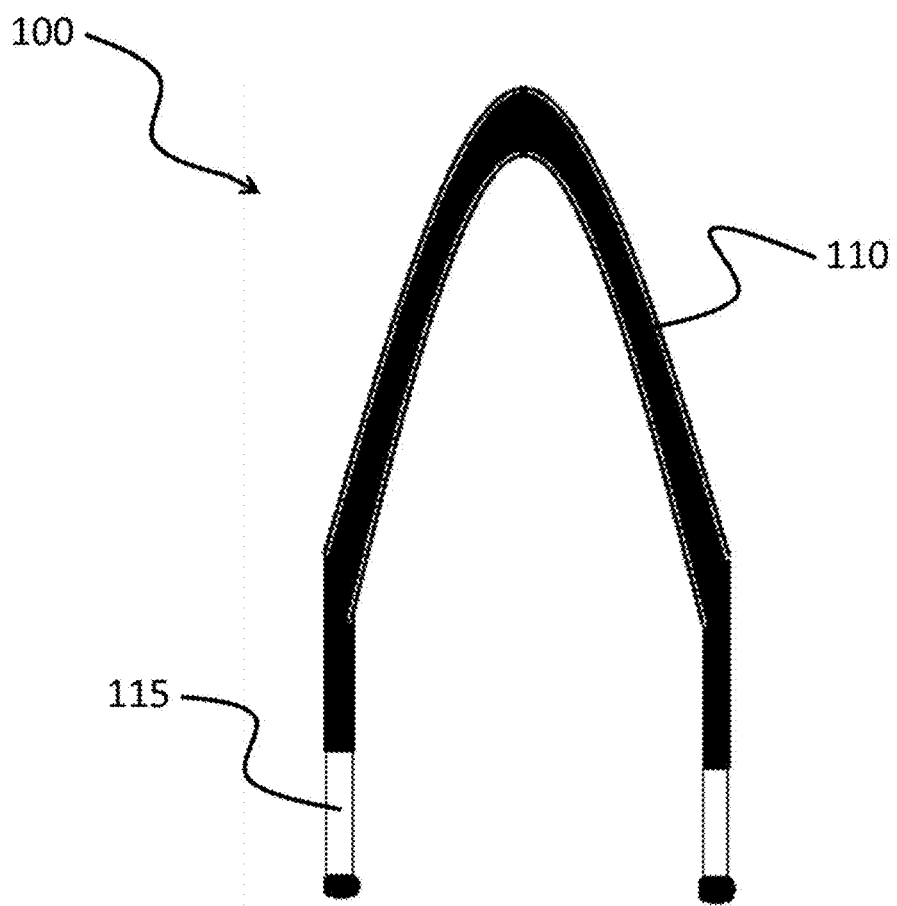
FIG. 2 depicts a light-diffusing element having a bent configuration.

After initial processing, the fabricated element may have a cylindrical or rod configuration. Post-fabrication processing may be employed to alter the shape of the light-diffusing element. Conventional softening, bending, and/or casting techniques may be employed to achieve bent or arbitrarily-shaped light-diffusing elements having voids in accordance with the present disclosure, for example, can be made. FIG. 2 illustrates an illumination fixture that includes a light-diffusing element with a bent configuration. Illumination fixture 100 includes light-diffusing element 110 and an optic 115 that may be used to couple light-diffusing element 110 to a light source.

Figure 3:
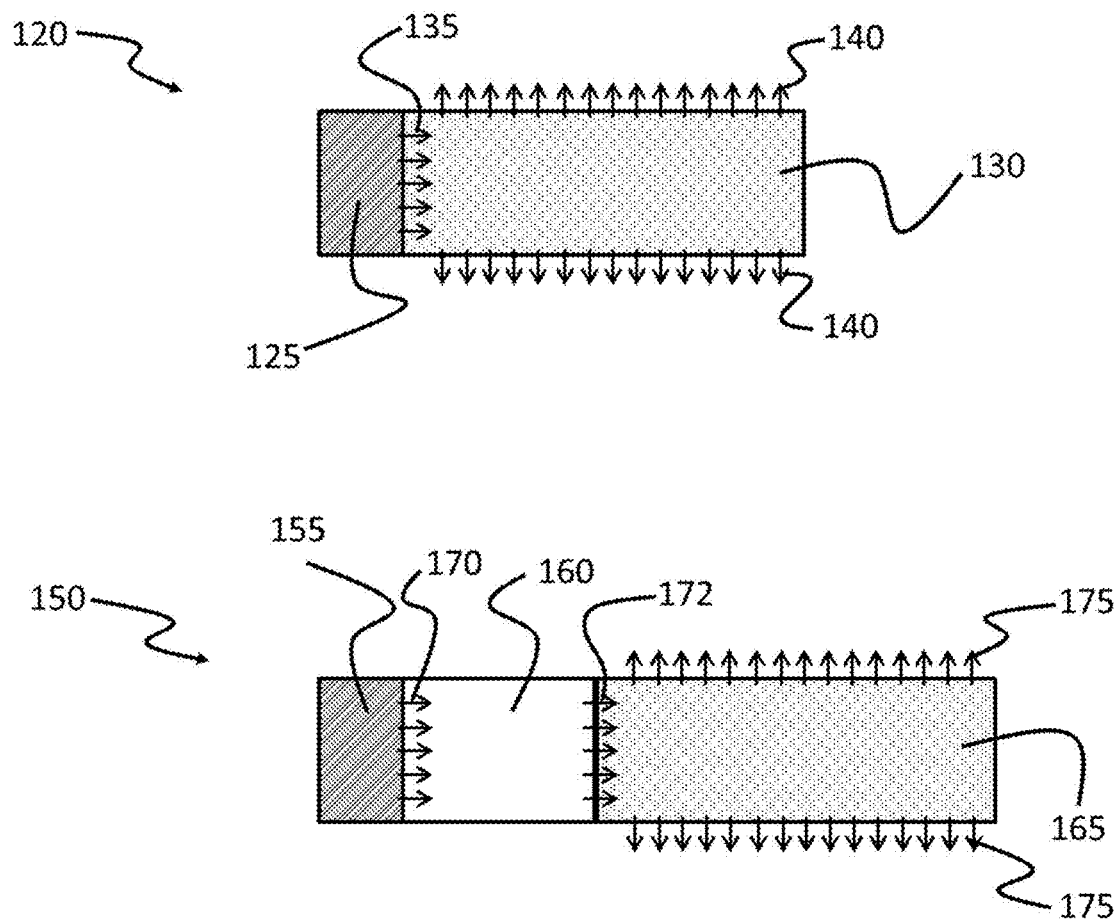
FIG. 3 depicts illumination systems incorporating a light-diffusing element.

FIG. 3 illustrates illumination systems incorporating a light-diffusing element. Illumination system 120 includes light source 125 and light-diffusing element 130. Light source 125 launches source light 135 into light-diffusing element 130. Internal voids within light-diffusing element 130 scatter source light 135 to produce illumination light 140 that exits through the outer surface of light-diffusing element 130. Light source 125 may be in direct contact with light-diffusing element 130 (e.g. "butt coupled") or an air gap may be present. Although illumination light 140 is depicted for reasons of convenience of illustration as parallel rays, it is to be understood that illumination light 140 may include rays of light that are directed in random directions.

Illumination system 150 includes light source 155, optic 160, and light-diffusing element 165. Light source 155 launches source light 170 into optic 160, which may process source light 170 to provide source light 172 to light-diffusing element 165. Internal voids within light-diffusing element 165 scatter source light 172 to produce illumination light 175 that exits through the outer surface of light-diffusing element 165. Although illumination light 175 is depicted for reasons of convenience of illustration as parallel rays, it is to be understood that illumination light 140 may include rays of light that are directed in random directions.

Light sources that may be incorporated in an illumination system include lamps, lasers, diodes, laser diodes, and light-emitting diodes. An intervening optic, such as optic 160 shown in FIG. 3, is an element of the illumination system that may facilitate coupling of a light source to a light-diffusing element. The optic may collect, collimate, focus, and/or otherwise process light supplied from a light source. The optic may be a solid glass element, a solid polymer or plastic element, a glass or polymer optical fiber, a lense or other coupling element.

Light-diffusing elements in accordance with the present disclosure may be deployed in illumination systems, as light sources (e.g. for photochemical reactions, cooling spaces, heating spaces, or closed spaces with controlled environments), and as luminaires. The light-diffusing elements are suitable for functional and decorative lighting applications.

EXAMPLE

Figure 4:
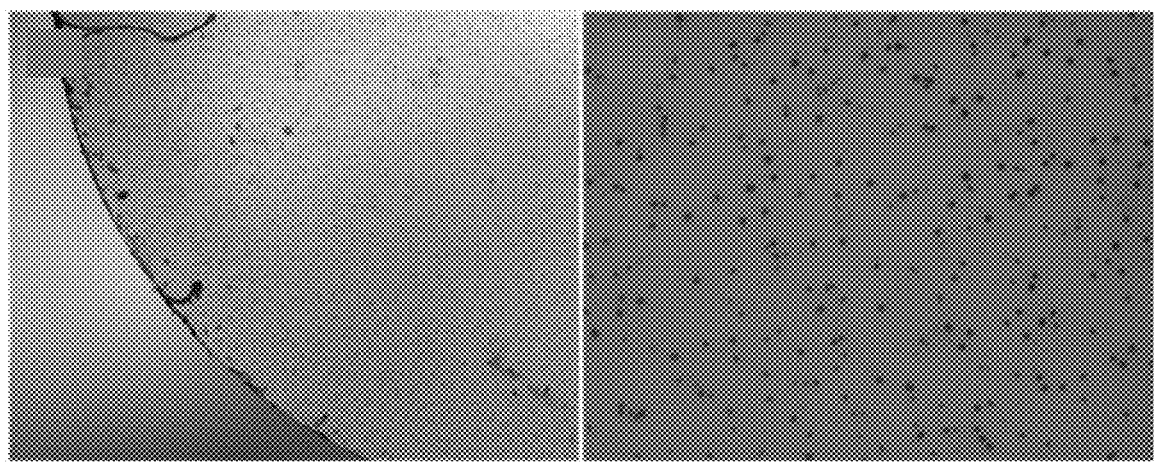
FIG. 4 is a cross-section image of a section of a light-diffusing element in two magnification scales.

Representative light-diffusing elements in accordance with the present disclosure were made. The light-diffusing elements were fabricated as glass rods having internal voids as described herein. A silica soot blank was chlorine dried first at 1125° C. for 1 hour in a consolidation furnace. The blank was consolidated by down driving through a sinter zone at a peak temperature of 1490° C. at a rate of 6 mm/min for 5 hours in the presence of $N_2$ (100%). After consolidation, the blank was redrawn into rod-shaped light-diffusing elements. Light-diffusing elements with diameters ranging from 1 mm to 6 mm were fabricated. FIG. 4 shows a micrograph of a representative cross-section of one of the light-diffusing elements. The depicted element had a diameter of 4.7 mm. The leftside image shows the cross-section at a magnification of 2.5× and the rightside image shows the cross-section at a magnification of 40×. The internal voids appear as dark spots in the images and were randomly distributed throughout the cross-section. Further imaging at higher magnification revealed that the internal voids had generally circular cross-sections with an average diameter of 1.20±0.53 μm.

What is claimed is:

1. A light-diffusing element comprising:
a solidified glass monolith including internal voids, said glass monolith having a cross-section with a dimension between 1 mm and 20 mm and a numerical aperture of at least 0.7, said internal voids having a cross-section with a dimension between 100 nm and 20 μm, said internal voids occupying between 0.5% and 20% of said cross-section of said glass monolith.

2. The light-diffusing element of claim 1, wherein said glass monolith has a cross-section with a dimension of at least 3 mm.

3. The light-diffusing element of claim 1, wherein said glass monolith has a length of at least 5 cm.

4. The light-diffusing element of claim 1, wherein said glass monolith has a length of at least 20 cm.

5. The light-diffusing element of claim 1, wherein said glass monolith has a length between 1 cm and 100 cm.

6. The light-diffusing element of claim 1, wherein said glass monolith has a numerical aperture of at least 0.8.

7. The light-diffusing element of claim 1, wherein said internal voids have a cross-section with a dimension between 500 nm and 10 μm.

8. The light-diffusing element of claim 1, wherein said internal voids have a length between 1 μm and 5 mm.

9. The light-diffusing element of claim 1, wherein the volume fraction of said internal voids is between 0.5% and 20%.

10. The light-diffusing element of claim 1, wherein said internal voids are localized in a first region of said cross-section of said glass monolith, said first region having a width between 5% and 90% of said dimension of said cross-section of said glass monolith.

11. The light-diffusing element of claim 10, wherein said first region has an annular shape.

12. The light-diffusing element of claim 1, wherein said internal voids are filled with a gas selected from the group consisting of Ar, Kr, $SO_2$, $N_2$, $CO_2$, $O_2$, air, $Cl_2$, and $CF_4$.

13. The light-diffusing element of claim 1, wherein said element is configured as a rod.

14. The light-diffusing element of claim 1, wherein said element is bent.

15. The light-diffusing element of claim 1, further comprising internal light, said voids scattering said internal light, the efficiency of said scattering varying by less than 50% of the maximum scattering efficiency along the length of said light-diffusing element.

16. The light-diffusing element of claim 15, wherein the scattering loss of said internal light is at least 100 dB/km.

17. The light-diffusing element of claim 1, further comprising a surface coating, said surface coating comprising a phosphor, a fluorophore, or a scattering material.

18. The light-diffusing element of claim 1, further comprising a polymer jacket, said polymer jacket surrounding said light-diffusing element.

19. The light-diffusing element of claim 18, further comprising a scattering layer, said scattering layer surrounding said light-diffusing element, said polymer jacket surrounding said scattering layer.

20. An illumination system comprising the light-diffusing element of claim 1 and a light-emitting diode, said light-emitting diode being coupled to said light-diffusing element.

21. The illumination system of claim 20, wherein said light-emitting diode has a cross-sectional area of 1 $mm^2$ and a numerical aperture of at least 0.6.

22. The illumination system of claim 20, further comprising an optic comprising glass or polymer, said optic receiving light from said light-emitting diode, said optic delivering said light to said light-diffusing element.

23. The light diffusing element of claim 1, wherein said internal voids are distributed throughout said cross-section.

24. The light diffusing element of claim 1, wherein said glass monolith includes a glass surrounding said internal voids, said glass having a uniform composition throughout said cross-section.

* * * * *